US008038095B2

(12) United States Patent
Herzberger et al.

(10) Patent No.: US 8,038,095 B2
(45) Date of Patent: Oct. 18, 2011

(54) MOTORISED AIRPLANE WITH MIXED HYDRODYNAMIC AND AERODYNAMIC STRUCTURE FOR TAKE-OFF AND LANDING ON WATER, GROUND OR SNOW

(75) Inventors: Erick Herzberger, Annecy (FR); Jean-Francois Clavreul, Le Bourget du Lac (FR)

(73) Assignee: Lisa Airplanes, Le Bourget Du Lac (FR)

( * ) Notice: Subject to any disclaimer, the term of this patent is extended or adjusted under 35 U.S.C. 154(b) by 369 days.

(21) Appl. No.: 12/227,853

(22) PCT Filed: Jun. 7, 2007

(86) PCT No.: PCT/FR2007/000936
§ 371 (c)(1),
(2), (4) Date: Dec. 1, 2008

(87) PCT Pub. No.: WO2007/141425
PCT Pub. Date: Dec. 13, 2007

(65) Prior Publication Data
US 2009/0127388 A1      May 21, 2009

(30) Foreign Application Priority Data
Jun. 9, 2006   (FR) ...................................... 06 05112

(51) Int. Cl.
*B64C 25/00*      (2006.01)
(52) U.S. Cl. ......................... 244/101; 244/105; 114/274
(58) Field of Classification Search .................. 244/101, 244/105, 106, 107, 108, 102 R, 102 A; D12/324; 114/272, 274
See application file for complete search history.

(56) References Cited

U.S. PATENT DOCUMENTS

| 1,511,689 | A | * | 10/1924 | Tarbox | 244/101 |
| 2,383,870 | A | * | 8/1945 | Ludington | 244/101 |
| 2,733,026 | A | * | 1/1956 | Ditter | 244/108 |
| 2,741,446 | A | * | 4/1956 | Jakimiuk | 244/102 R |
| 2,925,970 | A | * | 2/1960 | Heaslip | 244/108 |
| 2,942,808 | A | * | 6/1960 | Hoover | 244/103 R |
| 2,977,073 | A | * | 3/1961 | Ditter et al. | 244/108 |
| 3,020,009 | A | * | 2/1962 | Guilbert | 244/102 R |

(Continued)

FOREIGN PATENT DOCUMENTS

FR      2 856 655      12/2004

(Continued)

OTHER PUBLICATIONS

Translation of Herzberger, "Le rêve de Lisa," *Interpôle, Lettre d'Information de Savoie Technolac: Spécial Solaire*, [Online], No. 38, Nov. 2005-Dec. 2005, pp. 6.

*Primary Examiner* — Benjamin P Lee
(74) *Attorney, Agent, or Firm* — Oliff & Berridge, PLC

(57) ABSTRACT

A motorized airplane includes a landing gear with at least two legs capable of retracting into the fuselage via hatches. A pair of hydrofoils is fitted to the base of the fuselage in conformance with the ailerons used for lift and hydrodynamic stability, directed towards the base like a reverse V shape. The legs of the landing gear are each articulated around the pivot axes, fitted onto the hydrofoils. The landing gear is dual-function, using wheels or skis suspended on legs. Applications: airplane for landing on water, ground and snow.

11 Claims, 5 Drawing Sheets

U.S. PATENT DOCUMENTS

| | | | | |
|---|---|---|---|---|
| 3,347,499 | A * | 10/1967 | Larkin | 244/101 |
| 3,526,374 | A | 9/1970 | Risken | |
| 3,768,758 | A * | 10/1973 | Kubek | 244/108 |
| 3,854,679 | A | 12/1974 | Smethers, Jr. | |
| 4,027,835 | A * | 6/1977 | Sachs | 244/101 |
| 4,691,881 | A | 9/1987 | Gioia | |
| 5,570,857 | A * | 11/1996 | Landes et al. | 244/108 |
| 5,645,250 | A * | 7/1997 | Gevers | 244/101 |
| 5,850,990 | A * | 12/1998 | Gevers | 244/105 |
| 6,098,927 | A * | 8/2000 | Gevers | 244/123.8 |
| 7,055,779 | B1 * | 6/2006 | Discher | 244/108 |
| 7,290,774 | B2 * | 11/2007 | Despres | 280/28 |
| 7,350,751 | B2 * | 4/2008 | Hawkins | 244/101 |
| 7,500,678 | B1 * | 3/2009 | Whiting | 280/9 |
| 7,699,262 | B2 * | 4/2010 | Filipek | 244/105 |
| 2006/0226286 | A1 * | 10/2006 | Hawkins | 244/102 R |
| 2008/0302908 | A1 * | 12/2008 | Filipek | 244/105 |

FOREIGN PATENT DOCUMENTS

| | | | |
|---|---|---|---|
| GB | 2454531 A * | 5/2009 | |
| RU | 2 028 965 C1 | 2/1995 | |
| WO | WO 94/13531 | 6/1994 | |
| WO | WO 2005/000672 A1 | 1/2005 | |

* cited by examiner

MOTORISED AIRPLANE WITH MIXED HYDRODYNAMIC AND AERODYNAMIC STRUCTURE FOR TAKE-OFF AND LANDING ON WATER, GROUND OR SNOW

BACKGROUND OF THE INVENTION

The invention relates to a motorised airplane having a landing gear with two legs capable of retracting into the fuselage via hatches.

STATE OF THE ART

Known sea-plane fuselages generally comprise a keel or hull shape at the front, and a recess in the middle part of the undercarriage, which is immersed in the water. The suction effect on take-off on water is compensated by the presence of the recess, but once in the air after take-off, an aerodynamic effect occurs with formation of a turbulent flow which increases the drag of the airplane and the fuel consumption.

An amphibious airplane comprising excrescences in the form of salient covers integrating a part of the retracting landing gear has already been proposed. These excrescences do not have any dynamic lift function, having at most a static stability function to form floats.

Airplanes with hydrofoils for landing and take-off on water also exist, but the latter are not provided with a landing gear.

Additionally, known search and rescue airplanes on snow-covered terrain have retractable skis, which are not stowed inside the fuselage.

The document U.S. Pat. No. 4,691,881 describes a motorised airplane of amphibious type without a step and without skis wherein swivelling of the wheels takes place in appendices outside the fuselage. The vertical stabilisers under the fuselage have the function of channelling the air when the aircraft starts to skim on the water, and of going straight into the water without generating any lift effect. These stabilisers are not hydrofoils and do not enable any hydrodynamic lift to be obtained.

The document WO 94/13531 refers to an airplane having a landing gear that is able to retract into the undercarriage, and a ski outside the fuselage. The function of the ski is to skim over the water like a water ski so as to obtain a floatability effect on the surface of the water. There is no hydrofoil function, and the landing gear swivel-pin is located inside the fuselage.

The document RU 2028965 mentions a sea-plane with a hull that has three T-shaped hydrofoils. The main landing gear is retractable by means of a swivel-pin located on the landing gear legs, and not on the hydrofoils. The nose-wheel cannot be stowed in the undercarriage and the plane cannot land on snow.

OBJECT OF THE INVENTION

The object of the invention consists in providing a versatile airplane having reduced overall dimensions with a mixed hydrodynamic and aerodynamic structure and controls for take-off and landing on water, ground or snow.

According to the invention, the fuselage is provided at its base with a pair of hydrofoils shaped as hydrodynamic lifting and stabilising ailerons arranged in the downwards direction in a reverse U-shape, and the legs of the landing gear are each articulated around a swivel-pin arranged on the hydrofoils.

The presence of the hydrofoils generates a hydrodynamic lift effect when taking-off on water, as soon as a certain speed is reached. The plane can then leave the water quickly. Landing on water takes place gently and without bumps due to the guiding effect of the hydrofoils.

According to a preferred embodiment, the angle of incline of each hydrofoil with respect to the vertical direction is comprised between 25° and 70°, preferably between 40° and 60°. The fuselage is preferably smooth and the two hydrofoils are located symmetrically to the rear of the centre of gravity of the airplane in most cases of centring of the aircraft. Each hydrofoil is composed of an outer stabilising part and an inner anchoring part, separated from one another by a junction line with the fuselage. The external separating distance of each swivel-pin corresponds substantially to one fifth of the length of the outer part of each hydrofoil. The landing gear is mixed making use of wheels or skis supported by legs.

Other technical features can be used either alone or in combination:
- the landing gear comprises a main control mechanism of the legs equipped with wheels, and an auxiliary mechanism for locking the skis under the wheels when the landing gear is in the stowed position in the fuselage;
- the main mechanism is equipped with an actuator articulated at an intermediate point of each leg to form a toggle device enabling the landing gear to be retracted and deployed after the hatches have been opened;
- the actuator comprises a mobile actuating rod fixed inside the fuselage in the inner part of the corresponding hydrofoil, the assembly being arranged so that a part of the landing gear comprising the actuators and the two half-legs supporting the wheels is housed in the retracted position in a bottom compartment of the fuselage, whereas the other two half-legs articulated on the swivel-pins remain positioned in the hydrofoils outside the fuselage.

BRIEF DESCRIPTION OF THE DRAWINGS

Other advantages and features will become more clearly apparent from the following description of a particular embodiment of the invention given for non-restrictive example purposes only and represented in the accompanying drawings, in which.

DETAILED DESCRIPTION OF A PREFERRED EMBODIMENT OF THE INVENTION

Figure 1:
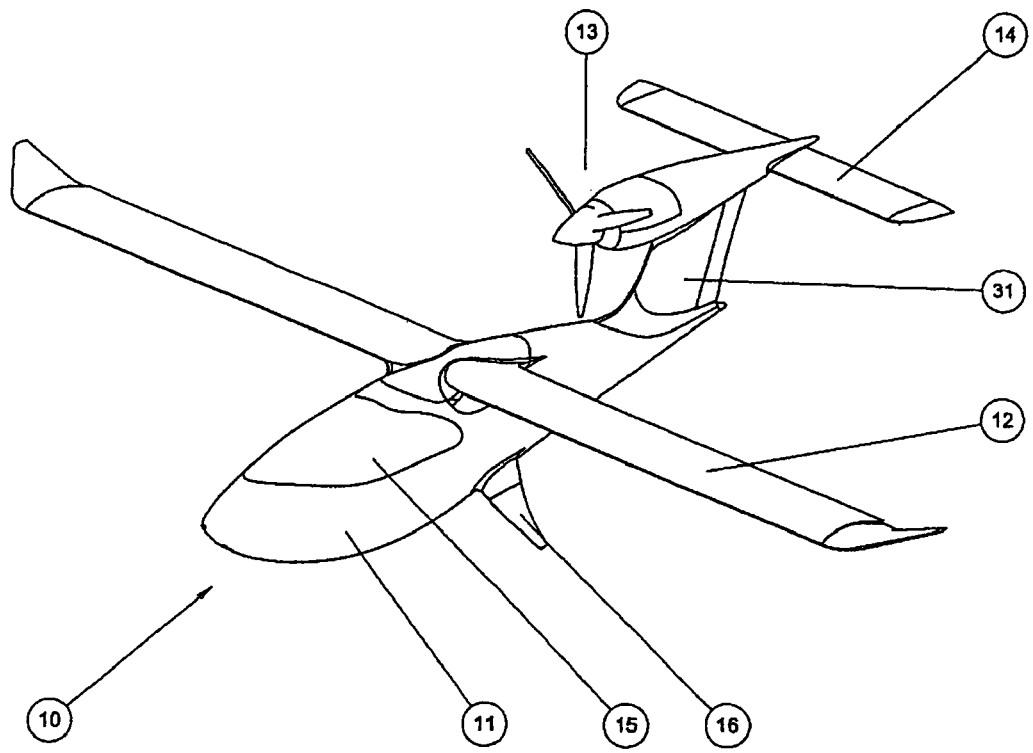
FIG. 1 is a schematic perspective view of the motorised airplane according to the invention.

In FIGS. 1 to 9, a motorised airplane, in particular a leisure plane of small dimensions, comprises a longitudinal fuselage 11 of smooth form without a hull or step, a variable-lift transverse wing 12, a propeller engine 13 associated with the tail fin 14 supported by the vertical stabiliser 31, and a cockpit 15. Such a plane 10 is versatile and has a hydrodynamic and aerodynamic structure suitable for take-off and landing on water, ground or snow.

The invention also applies to any other type of airplane wherein the propeller engine 13 can be replaced by a twin engine or a turboprop engine.

The cockpit 15 is placed in the mid-plane of symmetry, in front of the wing 12. Wing 12 can be of any type described in the document FR-A-2856655. Opposite the wing 12, the base of fuselage 11 is provided with a pair of hydrofoils 16 formed by lifting and stabilising ailerons directed downwards forming a reverse T-shape. The angle of incline of each hydrofoil 16 with respect to the vertical direction can be comprised between 25° and 70°, preferably between 40° and 60°. In most cases of centring of the aircraft, the longitudinal position of each hydrofoil 16 is situated to the rear of the centre of gravity of the airplane, in particular at a distance or about 100 mm to 300 mm. The presence of the two hydrofoils 16 enables the fuselage to be kept out of the water at low speed, which then means that the airplane can accelerate more quickly.

Figure 7:
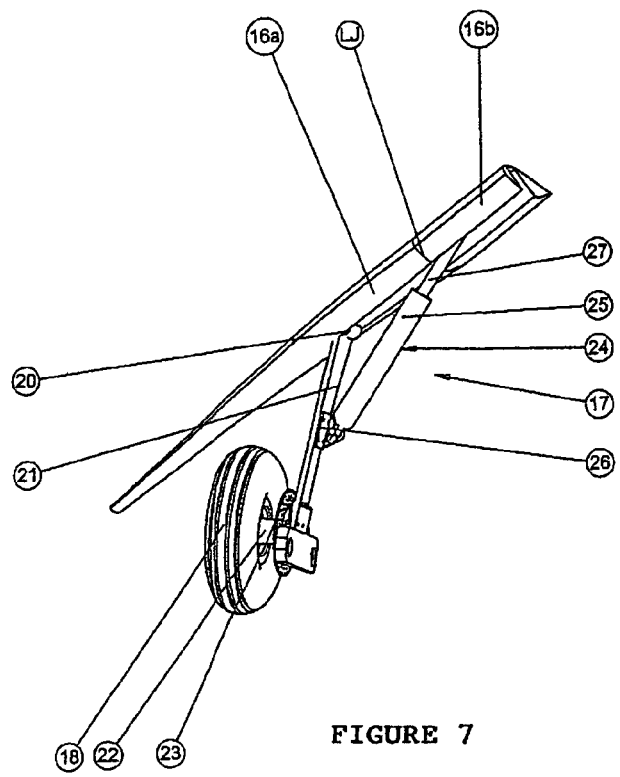
FIGS. 7 and 8 are perspective views of a half of the landing gear associated with a hydrofoil, respectively for take-off and landing on ground and on snow.
Figure 8:
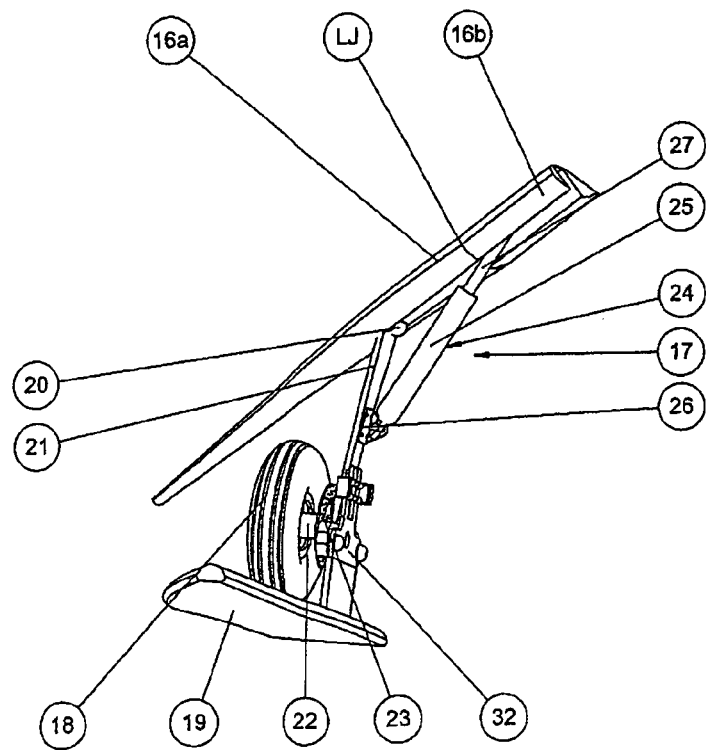
Figure 9:
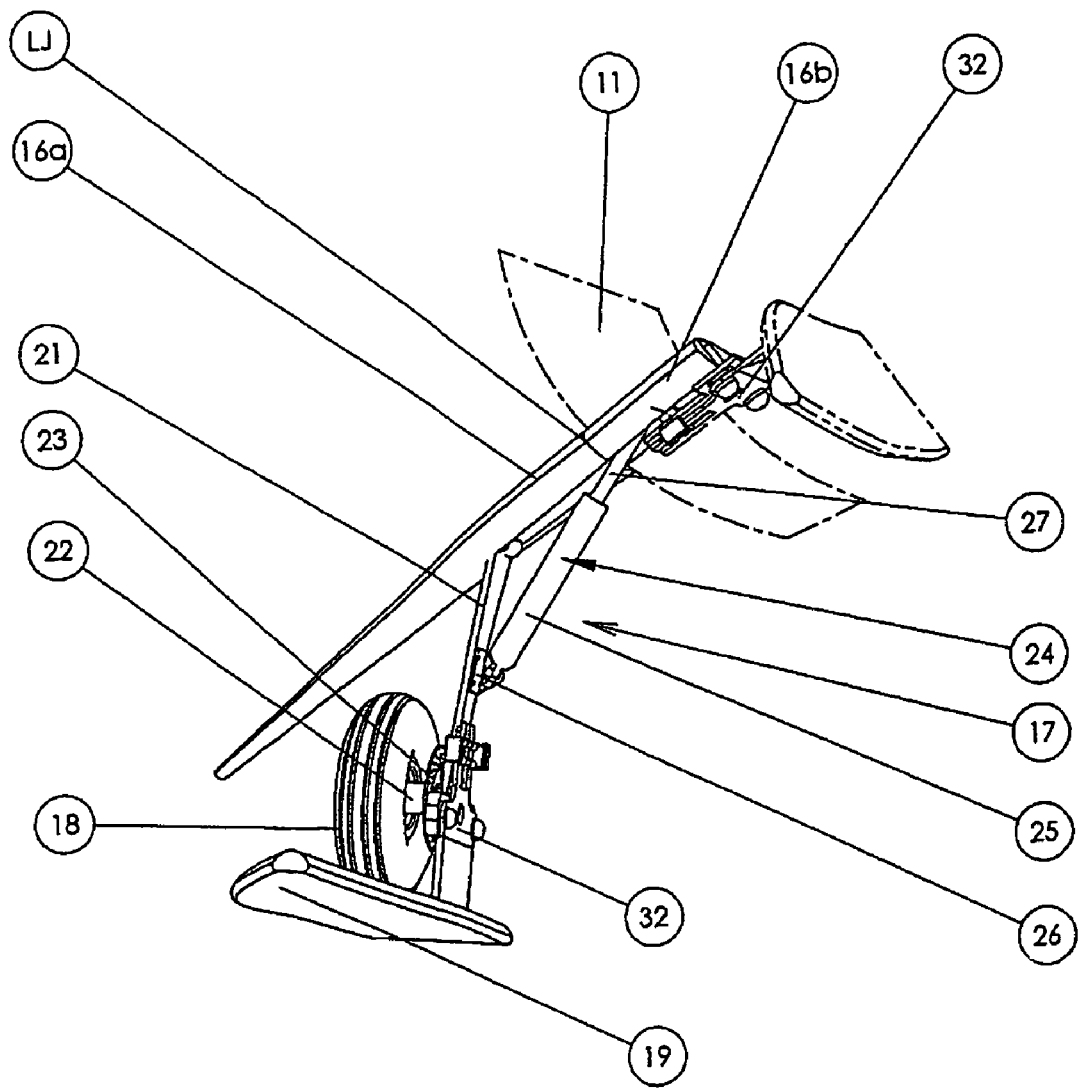
FIG. 9 shows a half of a complete landing gear with the mechanism for locking a ski under a wheel.

Each hydrofoil 16 is composed of a stabilising outer part 16A and an anchoring inner part 16B separated from one another by a junction line LJ (FIGS. 7 and 8).

For take-off and landing on ground or snow, airplane 10 is further equipped with a mixed landing gear 17 with wheels 18 and skis 19. In FIGS. 7 and 8, the swivel-pin 20 of each leg 21 of landing gear 17 is arranged on the corresponding hydrofoil 16, being offset from the junction LJ with the fuselage 11 by a predefined distance. For example, this distance is at least equal to one fifth of the length of the outer part 16a of each hydrofoil 16. The end of each landing leg 21 is equipped with a support spindle 22 of wheel 18. A disk braking system 23 is also fitted on support spindle 22 to slow the airplane down when landing.

Figure 6:
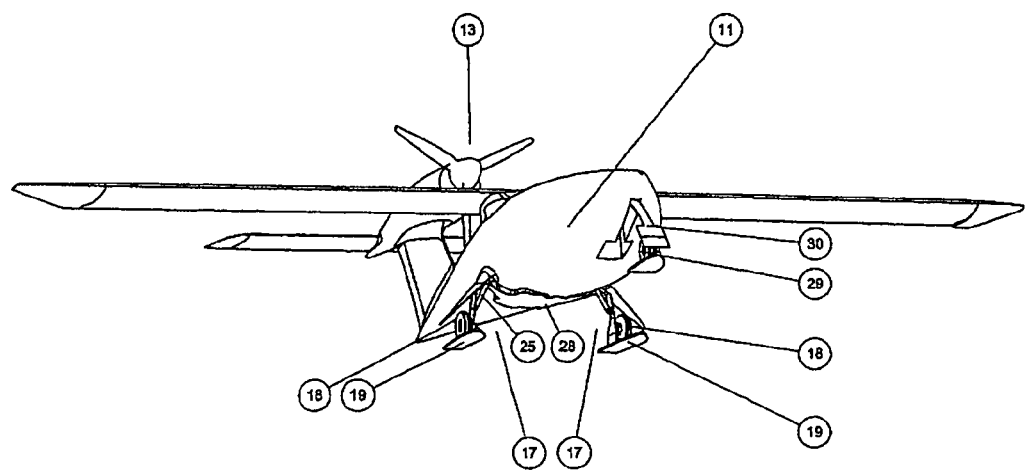

For each leg 21, the main control mechanism 24 of landing gear 17 comprises an actuator 25 articulated at an intermediate point 26 of leg 21 between swivel-pin 20 and wheel support spindle 22. The mobile actuating rod 27 of actuator 25 is fixed to inner part 16b of hydrofoil 16 at a point situated inside fuselage 11. The assembly constitutes a toggle device enabling each leg 21 to be retracted or deployed after operation of actuator 25. In the example of FIGS. 6 and 7, actuator 25 is formed by a hydraulic or electric jack, but any other type of actuator can be used.

The toggle device can also be replaced by any other drive system, in particular a transmission belt mechanism driven by an electric motor or by a kinematic system with an endless screw or rod assembly.

A part of the landing gear 17 comprising the actuators 25 and the two half-legs supporting the wheels 18 is housed in an inside compartment of fuselage 11 via swivelling hatches 28. The other half-legs articulated on swivel-pins 20 remain positioned in a recess of hydrofoils 16 outside fuselage 11.

For landing or take-off on snow, mixed landing gear 17 further comprises skis 19 that are able to be retracted and engaged from inside cockpit 15. An internal auxiliary mechanism 32, independent from main mechanism 24, enables skis 19 to be locked under wheels 18 when the landing gear is stowed inside fuselage 11. When legs 21 are deployed, the airplane will then be able to land on skis 19 (FIG. 6).

To the front of fuselage 11 there is located a third landing wheel 29 arranged in the mid-plane of symmetry and able to retract in flight into an auxiliary hatch 30. A third ski is locked under third wheel 29 when landing or taking-off on snow.

Figure 2:
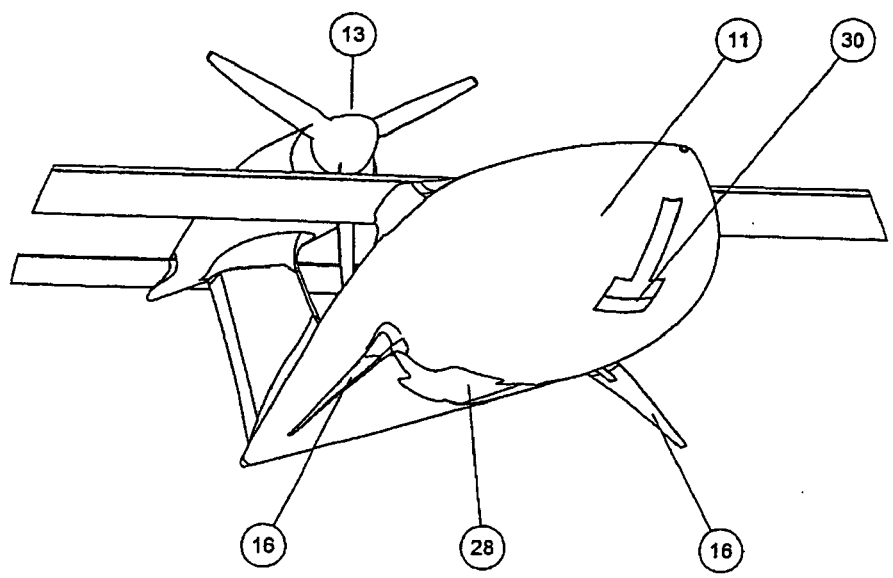
FIG. 2 shows an enlarged scale perspective view from the front of the airplane of FIG. 1, in flight configuration and for take-off and landing on water.

The operation for take-off and landing on water, ground or snow is performed in the following manner:

The flight configuration for take-off and landing on water is represented in FIG. 2. Landing gear 17 is stowed in smooth fuselage 11 after hatches 28 have been closed. When taking-off on water, the two hydrofoils 16 generate a hydrodynamic lift effect as soon as a certain speed is reached. Airplane 10 can then lift off from the water quickly. Landing on water takes place gently and with precision due to smooth fuselage 11 and to the guiding effect of hydrofoils 16.

Figure 3:
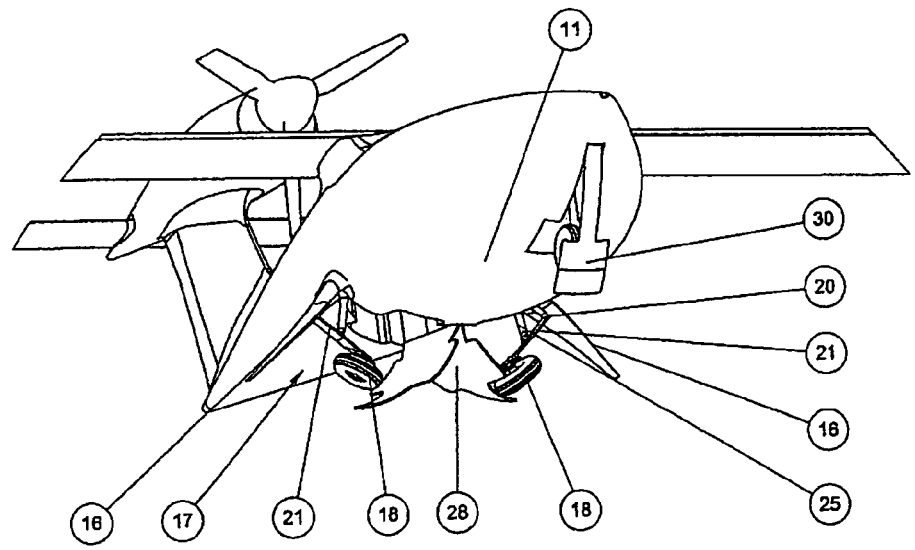
FIGS. 3 and 4 represent identical views to FIG. 2, respectively during deployment and in full deployment of the landing gear for take-off and landing on water.

The configuration of landing gear 17 in the course of deployment for take-off and landing on the ground is illustrated in FIG. 3. The hatches are partly open during the time legs 21, equipped with wheels 18 only, are manoeuvred. Skis 19 remain stowed in fuselage 11.

Figure 4:
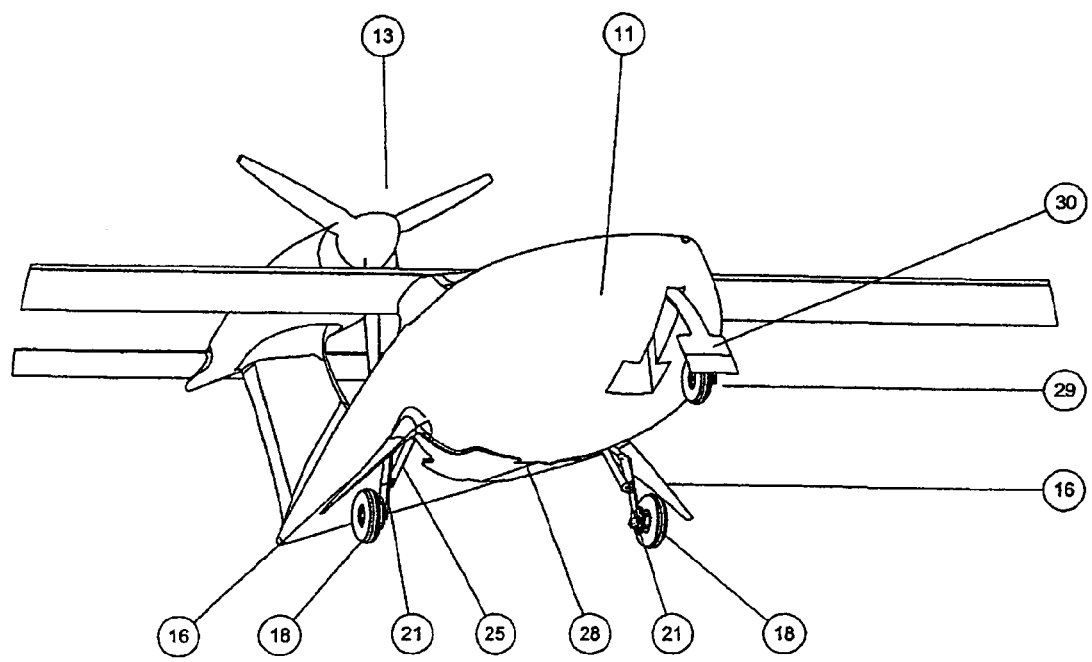

The configuration of landing gear 17 at the end of deployment travel for take-off and landing on the ground is illustrated in FIG. 4. The level of wheels 18 is located placed under the ends of hydrofoils 16, with legs 21 locked in the vertical position. Hatches 28 are completely or partially reclosed, whereas the third wheel 29 is deployed to support the front of airplane 10. Braking system 23 can then be put into operation.

Retraction of landing gear 17 into fuselage 11 is performed in flight by carrying out the above process in reverse.

Figure 5:
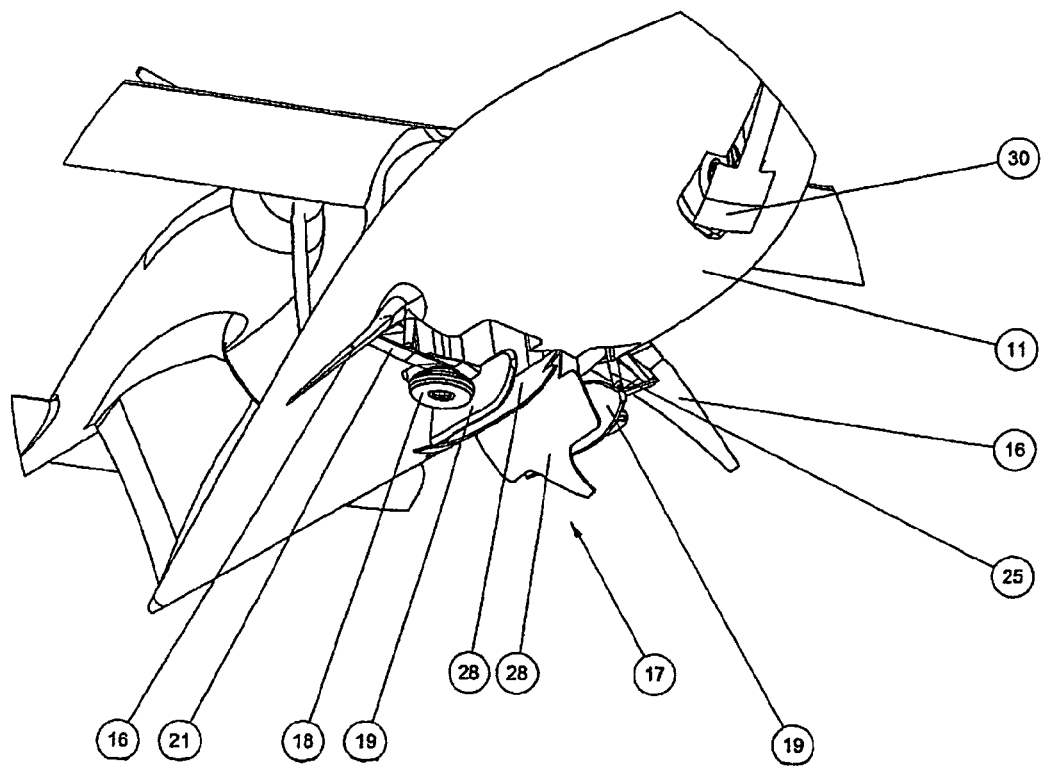
FIGS. 5 and 6 represent identical views to FIGS. 3 and 4, respectively during deployment and in full deployment of the landing gear for take-off and landing on snow.

FIGS. 5 and 6 are identical views to FIGS. 3 and 4 but for take-off and landing on snow. Before landing gear 17 is deployed, skis 19 are locked under wheels 18 by means of auxiliary mechanism 32. The rest of the operation is identical.

The invention claimed is:

1. A motorised leisure airplane, comprising:
   a longitudinal fuselage;
   a pair of hydrofoils; and
   a landing gear with two legs,
   wherein the fuselage is of smooth form without a hull or step,
   the pair of hydrofoils protrude from, and are fixedly fastened in a stationary manner to, the base of the fuselage,
   the pair of hydrofoils are shaped as hydrodynamic lifting and stabilising ailerons arranged in the downwards direction in a reverse U-shape, and
   the two legs of the landing gear are each articulated around a swivel-pin arranged on the hydrofoils, the two legs of the landing gear being retractable into the fuselage via hatches.

2. The leisure airplane according to claim 1, wherein the landing gear is mixed making use of wheels or skis supported by the legs.

3. The leisure airplane according to claim 1, wherein an angle of incline of each hydrofoil with respect to a vertical direction is in a range of between 25° and 70°.

4. The leisure airplane according to claim 1, wherein each hydrofoil is located to the rear of a center of gravity of the airplane.

5. The leisure airplane according to claim 1, wherein each hydrofoil is composed of a stabilising outer part and an anchoring inner part separated from one another by a junction line with the fuselage.

6. The leisure airplane according to claim 5, wherein the swivel-pin of each landing gear leg is offset from the junction line with the fuselage by a predefined distance.

7. The leisure airplane according to claim 6, wherein the predefined distance offsetting the swivel-pin of each landing gear leg from the junction line with the fuselage corresponds substantially to one fifth of a length of the stabilising outer part of each hydrofoil.

8. The leisure airplane according to claim 2, wherein the landing gear comprises a main control mechanism of the legs equipped with the wheels, and an auxiliary mechanism for locking the skis under the wheels when the landing gear is in a stowed position in the fuselage.

9. The leisure airplane according to claim 8, wherein the main control mechanism is equipped with an actuator articulated at an intermediate point of each leg to form a toggle device enabling the landing gear to be retracted and deployed after the hatches have been opened.

10. The leisure airplane according to claim 9, wherein the actuator comprises a mobile actuating rod fixed inside the fuselage to an inner part of a corresponding hydrofoil, an assembly being arranged so that a part of the landing gear comprising the actuators and two half-legs supporting the wheels is housed in the stowed position in a bottom compartment of the fuselage, whereas an other two half-legs articulated on the swivel-pins remain positioned in the hydrofoils outside the fuselage.

11. The leisure airplane according to claim 1, wherein an angle of incline of each hydrofoil with respect to a vertical direction is in a range of between 40° and 60°.

* * * * *